(12) United States Patent
Ahn

(10) Patent No.: US 6,219,333 B1
(45) Date of Patent: Apr. 17, 2001

(54) METHOD AND APPARATUS FOR SYNCHRONIZING A CARRIER FREQUENCY OF AN ORTHOGONAL FREQUENCY DIVISION MULTIPLEXING TRANSMISSION SYSTEM

(75) Inventor: Myong-kyun Ahn, Kyonggi-do (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/030,231

(22) Filed: Feb. 25, 1998

(30) Foreign Application Priority Data

Feb. 25, 1997 (KR) .................................................. 97/5786

(51) Int. Cl.[7] ............................... H04J 11/00; H04J 3/06
(52) U.S. Cl. ........................ 370/203; 370/481; 370/517; 375/326
(58) Field of Search .................................... 370/203, 208, 370/210, 503, 516, 517, 519, 480, 481, 482, 485, 350; 375/260, 326; 329/307

(56) References Cited

U.S. PATENT DOCUMENTS

| | | | | |
|---|---|---|---|---|
| 5,345,440 | * | 9/1994 | Gledhill et al. | 370/482 |
| 5,406,551 | * | 4/1995 | Saito et al. | 370/203 |
| 5,608,764 | * | 3/1997 | Sugita et al. | 375/344 |
| 5,657,313 | * | 8/1997 | Takahashi et al. | 370/491 |
| 5,774,450 | * | 6/1998 | Harada et al. | 370/206 |
| 6,058,101 | * | 5/2000 | Huang et al. | 370/208 |
| 6,091,702 | * | 7/2000 | Saiki | 370/203 |

* cited by examiner

*Primary Examiner*—Chau Nguyen
*Assistant Examiner*—Soon-Dong Hyun
(74) *Attorney, Agent, or Firm*—Sughrue, Mion, Zinn, Macpeak & Seas, PLLC

(57) ABSTRACT

A system for synchronizing a carrier frequency of an orthogonal frequency division multiplexing (OFDM) transmission apparatus, even when a carrier frequency offset is above a frequency bandwidth of one subchannel. The synchronization of the carrier frequency in the OFDM transmission apparatus is accomplished by alternating between a coarse mode for synchronizing an integer part of the carrier frequency offset and a fine mode for synchronizing a prime part of the carrier frequency offset.

21 Claims, 1 Drawing Sheet

METHOD AND APPARATUS FOR SYNCHRONIZING A CARRIER FREQUENCY OF AN ORTHOGONAL FREQUENCY DIVISION MULTIPLEXING TRANSMISSION SYSTEM

BACKGROUND OF THE INVENTION

1. Field of the Invention

The present invention relates to a synchronization of a carrier frequency in an orthogonal frequency division multiplexing (OFDM) transmission apparatus, and more particularly, to a system capable of synchronizing a carrier frequency efficiently even if a carrier frequency offset is above the frequency bandwidth of one subchannel. This synchronization is accomplished by incorporating both a coarse mode for synchronizing an integer part of the carrier frequency offset and a fine mode for synchronizing a prime part of the carrier frequency offset when performing the synchronization of a carrier frequency in the OFDM transmission apparatus. The present application is based upon Korean Application No. 5786/1997, which is incorporated herein by reference.

2. Description of the Related Art

Digital televisions generally adopt a frequency division multiplexing (FDM) transmission system which uses one of the multiple carrier modulation methods. Such an FDM system occupies almost the same frequency bandwidth required for transmitting data on a single carrier because the data has a longer symbol period when transmitted in parallel on several subchannels. The FDM signal is generated by an inverse fast Fourier transform (IFFT) and are modulated in parallel by carriers which are orthogonal to each other.

Synchronization of the carrier frequency should be achieved between a transmitter and a receiver before performing a fast Fourier transform at the receiver. When the carrier frequency between a transmitter and a receiver is offset, the carrier frequency offset is divided into an integer part and a prime part through a normalization of the frequency bandwidth of one subchannel.

The integer part of the offset causes the signals generated by the fast Fourier transform (FFT) to be circularly shifted at a receiver, and the prime part of the offset causes the power and phase of the signals to be disturbed by an interference with the subchannels.

As described above, when the carrier frequency is offset between a transmitter and a receiver, the offset causes interference between the carriers of subchannels, and orthogonality between the subchannels cannot be maintained, thereby increasing the error rate of transmitted data.

In the OFDM transmission systems using methods which can be used in a terrestrial high definition television, an 8K discrete Fourier transform (DFT) and a 2K DFT are standard. The recovery of the carrier has been developed as the main technology of the transmission.

The existing methods for synchronization used in the OFDM transmission system synchronize the carrier frequency by considering that its phase is rotated uniformly when the carrier frequency is not synchronized.

The conventional methods for synchronization in the OFDM transmission apparatus work well when the carrier frequency offset is within the bandwidth of one subchannel. When the carrier frequency offset is, however, above the bandwidth of one subchannel, it is difficult to measure the rotational amount of the phase, and synchronization fails.

SUMMARY OF THE INVENTION

It is an object of the present invention to provide a method for synchronizing a carrier frequency of an orthogonal frequency division multiplexing (OFDM) transmission apparatus, wherein the method is capable of successfully synchronizing the carrier frequency even when the offset of the carrier frequency is above the bandwidth of one subchannel.

It is another object of the present invention to synchronize the carrier frequency by regularly alternating between a coarse mode for compensating an integer part of the carrier frequency offset and a fine mode for compensating a prime part of the carrier frequency offset.

According to one aspect of the present invention, a method for synchronizing a carrier frequency of the OFDM transmission system first selects one of a coarse mode for correcting an integer part of a carrier frequency offset and a fine mode for correcting a prime part of the carrier frequency offset. When the coarse mode is selected, a strength of a carrier which is received in each subchannel is calculated, the calculated strength of the carrier and a strength of a previous carrier delayed for a duration of one symbol for a predetermined period until the accumulated value reaches a predetermined threshold value is accumulated, and the integer part of the carrier frequency offset is corrected using the accumulated value. When the fine mode is selected, a pilot signal is extracted from the carrier, a phase difference between the extracted pilot signal and a previously extracted pilot signal which is delayed for a duration of one symbol is calculated, and the prime part of the carrier frequency offset within a predetermined frequency is corrected by controlling a gain of the calculated phase difference.

Preferably, the threshold value is set to be half of the strength of the received carrier.

Preferably, the integer part of the carrier frequency offset can be corrected within half of the frequency bandwidth of one subchannel.

Preferably, the phase difference is obtained by dividing an averaged value of the phase difference between each pilot signal and its previous pilot signal within one symbol duration by a predetermined value.

According to another aspect of the present invention, an apparatus for synchronizing the carrier frequency of the OFDM transmission system includes a data demodulation unit, a first mode switch, a symbol accumulation unit, a hold value detection unit, an offset detection unit, a loop filter unit, a second mode switch, and a voltage controlling oscillation unit.

The data demodulation unit uses an oscillating voltage to sample input carrier data. The first mode switch switches the demodulated carrier data between a coarse mode and a fine mode for respectively correcting an integer part and a prime part of a carrier frequency offset. The symbol accumulation unit accumulates a strength value of the carrier frequency offset of the carrier data received from the first mode switch and a strength value of the carrier frequency offset which is delayed for a duration of one symbol. The hold value detection unit detects a hold value by comparing the strength value of the accumulated carrier frequency offset until the strength value reaches a threshold value. The offset detection unit detects the frequency offset of the demodulated carrier received from the first mode switch, and obtains a phase difference between the carrier frequency offset of the present symbol and a carrier frequency offset of a previous symbol. The loop filter unit controls a gain of the phase difference.

The second mode switch selects and outputs one value of the filtered phase difference and the hold value obtained by the hold value detection unit. The voltage controlling oscillation unit, which is locked to the hold value and the phase difference value selected by the second mode switch, respectively corrects the integer part and the prime part of the carrier frequency offset of the data demodulation unit, and provides the oscillating voltage to the data demodulation unit.

The data demodulation unit includes a serial-to-parallel conversion unit, a mixer, a fast Fourier transform unit and a parallel-to-serial conversion unit. The serial-to-parallel conversion unit converts the input carrier data into parallel data. The mixer mixes the parallel data and the oscillating voltage which is fed back from the voltage controlling oscillation unit. The fast Fourier transform unit extracts sample data by converting the mixed carrier data to orthogonality. The parallel-to-serial conversion unit converts the sample carrier data into serial data, and outputs the serial sample carrier data.

Preferably, the symbol accumulation unit includes an absolute value calculation unit, a first symbol delay unit and an adder. The absolute value calculation unit calculates the strength value of the carrier frequency offset of the carrier data received from the first mode switch. The first symbol delay unit delays the strength value calculated by the absolute value calculation unit for a duration of one symbol. The adder accumulates the strength value delayed by the first symbol delay unit and the strength value obtained by the absolute value calculation unit, and outputs the accumulated value.

The hold value detection unit includes an envelope detection unit, and a rise edge detection unit. The envelope detection unit detects an envelope value by comparing the accumulated strength value received from the adder with a predetermined threshold value. The rise edge detection unit controls the voltage controlling oscillation unit through the second mode switch using the envelope value detected by the envelope detection unit.

Preferably, the offset detection unit includes a continuous pilot extraction unit, a second symbol delay unit and a subtracter. The continuous pilot extraction unit extracts a continuous pilot signal from the serial carrier data which is obtained from the first mode switch. The second symbol delay unit delays the extracted continuous pilot signal for a duration of one symbol period, and outputs the delayed extracted continuous pilot signal. The subtracter obtains a phase difference between the delayed continuous pilot signal the present continuous pilot signal, and supplies the phase difference to the loop filter unit.

As a result, it is possible to precisely correct the carrier frequency offset using the coarse mode and the fine mode. The course mode is used to compensate the integer part of the carrier frequency offset. The fine mode is used to compensate the prime part, at a predetermined time interval. Accordingly, even when the carrier frequency offset is above the bandwidth of one subchannel, the integer part and the prime part of the carrier frequency offset can be corrected, thereby resulting in a precise synchronization of the carrier frequency.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
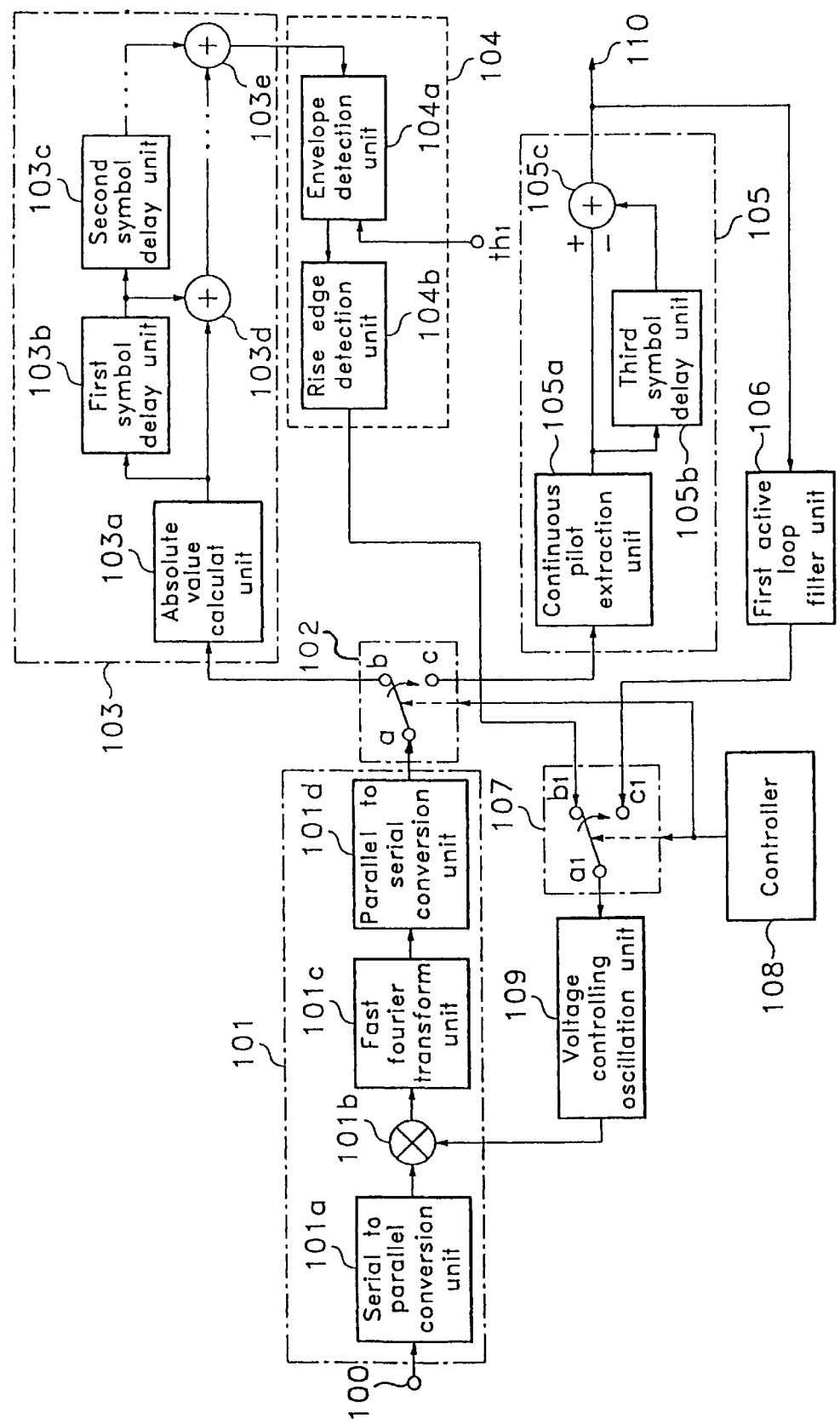
FIG. 1 is a block diagram illustrating an embodiment of a synchronizing apparatus of a carrier frequency in an OFDM transmission system according to the present invention.

FIG. 1 is a block diagram illustrating an apparatus for synchronizing a carrier frequency of an orthogonal frequency division multiplexing (OFDM) transmission system according to a preferred embodiment of the present invention.

The apparatus for synchronizing the carrier frequency of the OFDM transmission system includes a data demodulation unit 101, a first mode switch 102, a symbol accumulation unit 103, a hold value detection unit 104, an offset detection unit 105, a first-order active loop filter unit 106, a second mode switch 107 and a voltage controlling oscillation unit 109.

The data demodulation unit 101 uses an oscillating feedback voltage to sample carrier data of a signal received via an input terminal 100. The first mode switch 102 switches the demodulated carrier of the data demodulator 101 into either a coarse mode or a fine mode. The symbol accumulation unit 103 adds a calculated strength value of the carrier frequency offset of the data input by the first mode switch 102 and a strength value of an accumulated carrier frequency offset which is delayed for a duration of one symbol. The hold value detection unit 104 determines a hold value by comparing the strength value of the accumulated carrier frequency offset with a threshold value. The offset detection unit 105 detects the carrier frequency offset of the demodulated carrier obtained from the first mode switch 102 and then obtains a phase difference between the carrier frequency offset of a present symbol and that of a previous symbol. The first-order active loop filter unit 106 controls the gain of the phase difference received from the offset detection unit 105. The second mode switch 107 selects and outputs one value of the phase difference value which is filtered by the first-order active loop filter unit 106 and the hold value of the hold value detection unit 104. The voltage controlling oscillation unit 109, which is locked to the hold value or phase difference value which is selected by the second mode switch 107, corrects the integer part and the prime part of the carrier frequency offset of the data demodulation unit 101. The controller 108 switches and controls the first and second switches 102 and 107 at a predetermined time interval.

The data demodulation unit 101 includes a serial-to-parallel conversion unit 101a, a mixing unit 101b, a fast Fourier transform unit 101c, and a parallel-to-serial conversion unit 101d. The serial-to-parallel conversion unit 101a converts the serial carrier data received through input terminal 100 into parallel data. The mixing unit 101b mixes the parallel data converted by the serial-to-parallel conversion unit 101a and an oscillated voltage which is fed back by the voltage controlling oscillation unit 109. The fast Fourier transform unit 101c extracts sample data by orthogonally converting the carrier data mixed in the mixing unit 101b. The parallel-to-serial conversion unit 101d converts the sample carrier data which is input by the fast Fourier transform unit 101c into serial data, and then outputs the data.

The symbol accumulation unit 103 includes an absolute value calculation unit 103a, first and second symbol delay units 103b and 103c, and first and second addition units 103d and 103e. The absolute value calculation unit 103a calculates the signal strength of the carrier data which is obtained from the first mode switch 102. The first and second symbol delay units 103b and 103c successively delay the symbol by one symbol, considering the signal strength calculated by the absolute value calculation unit 103a. The first and second addition units 103d and 103e respectively accumulate the strength value of the signal delayed by the first and second symbol delay units 103b and 103c and the strength value of the signal which is obtained by the absolute value calculation unit 103a, and then output the accumulated values.

The hold value detection unit 104 includes an envelope detection unit 104a and a rise edge detection unit 104b. The envelope detection unit 104a detects an envelope by comparing the accumulated value of the signal strength obtained from the second addition unit 103e with a predetermined threshold value th1. The rise edge detection unit 104b controls the voltage controlling oscillation unit 109 through the second mode switch 107 using the envelope value detected by the envelope detection unit 104a.

The offset detection unit 105 includes a continuous pilot extraction unit 105a, a third symbol delay unit 105b and a subtraction unit 105c. The continuous pilot extraction unit 105a extracts a continuous pilot signal from the serial carrier data obtained from the first mode switch 102. The third symbol delay unit 105b delays the extracted continuous pilot signal for a duration of one symbol. The subtraction unit 105c obtains a phase difference between the delayed continuous pilot signal and a present continuous pilot signal, and then supplies the phase difference to the first-order active loop filter unit 106.

The operation of the preferred embodiment of the present invention will be explained in detail with reference to FIG. 1.

First, when the carrier data is input through the input terminal 100, the data demodulation unit 101 samples the received signal using an oscillating feedback voltage which is obtained from the voltage controlling oscillation unit 109, and then supplies the sampled data to the first mode switch 102. In other words, the serial-to-parallel conversion unit 101a of the data demodulation unit 101 converts the carrier data which is input serially through the input terminal 100 into parallel data, and the mixing unit 101b mixes the parallel data with the oscillating voltage which is input by the voltage controlling oscillation unit 109 and then supplies the mixed data to the fast Fourier transform unit 101c. The fast Fourier transform unit 101c of the data demodulation unit 101 then converts the carrier data orthogonally input through the mixing unit 101b at a high speed and then outputs the Fourier-transformed data.

When there is a carrier frequency offset in the carrier data which is serially input to the mixing unit 101b, and when the data demodulation unit 101 performs the orthogonal transformation of the data at a high speed, the phase of the carrier data is shifted circularly by an amount which is as much as the integer part value of the carrier frequency offset.

The parallel-to-serial conversion unit 101d converts the carrier data which is orthogonally transformed by the fast Fourier transform unit 101c from parallel to serial, and then supplies the serial data to a movable terminal "a" of the first mode switch 102, which may be an analog switch. When the controller 108 moves the movable terminal "a" to a fixed branch "b" by controlling the first mode switch 102 to start the coarse mode, the serial carrier data is supplied from the parallel-to-serial conversion unit 101d to the symbol accumulation unit 103 through the movable branch "a" and the fixed branch "b" of the first mode switch 102.

The symbol accumulation unit 103 calculates the strength of the integer part of the carrier frequency offset from the carrier data which is currently input and accumulates the calculated value and the strength of the carrier frequency offset which is delayed for a duration of one symbol during several symbol periods. The symbol accumulation unit 103 then supplies the accumulated value to the hold value detection unit 104.

The signal strength which is determined by the absolute value calculation unit 103a is delayed in each of the first and second symbol delay units 103b and 103c for a duration of one symbol unit. The signal strength which is delayed for a duration of one symbol by the first symbol delay unit 103b and the strength value of the present signal which is input by the absolute value calculation unit 103a are accumulated by the first addition unit 103d. This first accumulated strength value and a signal strength which is delayed by the second symbol delay unit 103c are accumulated by the second addition unit 103e, and then this second accumulated strength value is supplied to the hold value detection unit 104.

There is a guard band whose signal power is zero (0) in the carrier data which is switched by the first mode switch 102. The guard band is a frequency band left vacant between two subchannels to safeguard against mutual interference. The carrier data regarding carrier indexes for several symbols are accumulated in the symbol accumulation unit 103, and are then supplied to the hold value detection unit 104.

The hold value detection unit 104 calculates the strength of the carrier accumulated by the symbol accumulation unit 103 until the accumulated value reaches the threshold value th1, and then determines the amount the signal of the guard band has shifted. The hold value detection unit 104 then corrects the integer part of the carrier frequency offset within a half band of one channel. In other words, the envelope detection unit 104a of the hold value detection unit 104 detects the envelope and compares the signal strength of the carrier accumulated by the symbol accumulation unit 103 with the threshold value th1. Here, the envelope is obtained by designating the threshold value th1 to be half the signal power.

The rise edge detection unit 104b counts until the value obtained by the envelope detection unit 104a becomes larger than the threshold value th1. When the counting is completed at a rising edge, the counted value is maintained and supplied to a fixed branch "b1" of the second mode switch 107, which may be an analog switch.

The second mode switch 107 is controlled, together with the first mode switch 102, by the controller 108, and is connected to the fixed branch "b1" by the controller 108. As a result, the hold value which is detected by the rise edge detection unit 104b is supplied to the voltage controlling oscillation unit 109 through the second mode switch 107.

The voltage controlling oscillation unit 109 generates the oscillating voltage corresponding to the hold value which is input by the second mode switch 107 and supplies the oscillating voltage to the mixing unit 101b of the data demodulation unit 101. Here, the integer part of the carrier frequency offset is corrected within a half frequency bandwidth of one channel.

A timing control signal which is used for the fine mode is determined according to how many symbols of the carrier data is accumulated in the symbol accumulation unit 103. Moreover, in the fine mode, the carrier frequency offset is corrected within several frequencies by using the phase difference between the continuous pilot signals and the carrier frequency offset. In other words, the carrier frequency offset ($\epsilon$) brings about a phase shift which is as much as $2\pi\epsilon(1+\Delta N)$ to the receiving signal, where $\Delta$ is the frequency bandwidth of a subchannel and N is the number of points which are used in the fast Fourier transform unit 101c.

The units used during the fine mode include the offset detection unit 105, the first-order active loop filter unit 106 and the voltage controlling oscillation unit 109. The offset detection unit 105 performs the fine mode using the fast Fourier transform unit 101c, the parallel-to-serial conversion unit 101d, the continuous pilot extraction unit 105a, the third symbol delay unit 105b and the subtraction unit 105c.

The operation of the fine mode for correcting the prime part of the carrier frequency offset will now be described.

First, when the operation of the coarse mode has been completed, the controller 108 moves the movable terminals "a" and "a1" of the first and second mode switches 102 and 107 to be connected to the fixed branches "c" and "c1". Accordingly, the fast Fourier transform unit 101b performs the fast Fourier transform of the sampled sequence by N number of points, and then supplies the result to the continuous pilot extraction unit 105a of the offset detection unit 105 via the parallel-to-serial conversion unit 101d, the movable terminal "a" and fixed branch "c" of the first switch 102.

The continuous pilot extraction unit 105a of the offset detection unit 105 continuously extracts the pilot components from the carrier data of N number of points which are input through the fast Fourier transform unit 101c, and then supplies the extracted pilot signal to the subtraction unit 105c through the third symbol delay unit 105b.

The subtraction unit 105c calculates the phase difference between the present pilot signal extracted by the continuous pilot extraction unit 105a and a pilot signal which is transmitted and extracted from the same subchannel and is delayed by the third symbol delay unit 105b. In other words, by averaging the phase differences of the pilot signals within one symbol through the continuous pilot extraction unit 105a, the third symbol delay unit 105b and the subtraction unit 105c, a presumed value regarding the carrier frequency offset can be determined. The phase difference between the pilot signals which are transmitted in the same subchannel between the adjacent two symbols is proportional to the carrier frequency offset. By dividing this averaged value by $2\pi\epsilon(1+\Delta)$, the phase difference between the symbols can be obtained. The phase difference obtained by the subtracter 105c is output through an output terminal 110, is filtered through the first-order active loop filter unit 106, and is then supplied to the second mode switch 107.

The first-order active loop filter unit 106 uses both a proportional gain Kp when the present output of the offset detection unit 105 is to be directly input to the voltage controlling oscillation unit 109, and uses an integer gain Ki when an average of the previous outputs of the offset detection unit 105 are to be input to the voltage controlling oscillation unit 109. When the gains can be expressed as a natural frequency 4n, the proportional gain Kp becomes $\omega n(1+\omega n)$ and the integer gain Ki becomes $4\omega n^2$.

When signals pass through the first-order active loop filter unit 106 and are input to the voltage controlling oscillation unit 109 through the second mode switch 107, the gain of the voltage controlling oscillation unit 109 is one (1).

The voltage controlling oscillation unit 109 can reduce the prime part of the carrier frequency offset which is output from the mixing unit 101b within several frequencies using the gain of the first-order active loop filter unit 106. Here, the small natural frequency $\omega n$ should be determined to be the remaining carrier frequency offset, and it is thus possible to track the carrier in fast speed.

As described above, by alternating between the coarse mode for compensating the integer part of the carrier frequency offset and the fine mode for compensating the prime part with at a predetermined time interval, the synchronization of the carrier frequency in the OFDM transmission apparatus can be achieved.

While there have been illustrated and described what are considered to be a preferred embodiment of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for synchronizing a carrier frequency of an OFDM transmission system, comprising the steps of:
   selecting one of a coarse mode for correcting an integer part of a carrier frequency offset and a fine mode for correcting a prime part of the carrier frequency offset;
   calculating a strength of a carrier which is received in each subchannel when the coarse mode is selected;
   accumulating the calculated strength of the carrier and a strength of a previous carrier delayed for a duration of one symbol for a predetermined period until the accumulated value reaches a predetermined threshold value;
   correcting the integer part of the carrier frequency offset using the accumulated value;
   extracting a pilot signal from the carrier when the fine mode is selected;
   calculating a phase difference between the extracted pilot signal and a previously extracted pilot signal which is delayed for a duration of one symbol; and
   correcting the prime part of the carrier frequency offset within a predetermined frequency by controlling a gain of the calculated phase difference.

2. The method of claim 1, wherein the strength of the carrier is calculated using a square of an absolute value of the carrier amplitude.

3. The method of claim 2, further comprising the step of setting an average value of the calculated strength of the carrier as the threshold value.

4. The method of claim 1, wherein the correction of the integer part of the carrier frequency offset is performed within a predetermined frequency bandwidth between each carrier.

5. The method of claim 4, wherein the correction of the integer part of the carrier frequency offset is performed by accumulating the calculated strength of the present carrier and a signal strength of the previous carrier for a duration of at least two symbol periods.

6. The method of claim 4, wherein the integer part of the carrier frequency offset is corrected within a half frequency bandwidth of one subchannel.

7. The method of claim 1, wherein the phase difference is obtained by dividing a value which is obtained by averaging phase differences of pilot signals within one symbol by a predetermined value.

8. The method of claim 7, wherein a phase difference between adjacent symbols is obtained by dividing the average value of the phase differences of pilot signals within one symbol by $2\pi\epsilon(1+\Delta)$, where $\epsilon$ is the carrier frequency offset and $\Delta$ is a frequency bandwidth of a subchannel.

9. The method of claim 7, wherein the prime part of the carrier frequency offset is corrected within a predetermined frequency by proportionally controlling the gain with the calculated phase difference.

10. An apparatus for synchronizing a carrier frequency of an OFDM transmission system, comprising:
- a data demodulation unit for using an oscillating voltage to sample input carrier data;
- a first mode switch for switching the demodulated carrier data between a coarse mode and a fine mode for respectively correcting an integer part and a prime part of a carrier frequency offset;
- a symbol accumulation unit for accumulating a strength value of the carrier frequency offset of the carrier data received from said first mode switch and a strength value of the carrier frequency offset which is delayed for a duration of one symbol;
- a hold value detection unit for detecting a hold value by comparing the strength value of the accumulated carrier frequency offset until the strength value reaches a threshold value;
- an offset detection unit for detecting the frequency offset of the demodulated carrier received from said first mode switch, and obtaining a phase difference between the carrier frequency offset of the present symbol and a carrier frequency offset of a previous symbol;
- a loop filter unit for controlling a gain of the phase difference;
- a second mode switch for selecting and outputting one value of the filtered phase difference and the hold value obtained by said hold value detection unit;
- a voltage controlling oscillation unit, which is locked to the hold value and the phase difference value selected by said second mode switch, for respectively correcting the integer part and the prime part of the carrier frequency offset of said data demodulation unit, and for providing the oscillating voltage to said data demodulation unit; and
- a controller for switching and controlling said first and second switches at a predetermined time interval.

11. The apparatus of claim 10, wherein said data demodulation unit comprises:
- a serial-to-parallel conversion unit for converting the input carrier data into parallel data;
- a mixer for mixing the parallel data and the oscillating voltage which is fed back from said voltage controlling oscillation unit;
- a fast Fourier transform unit for extracting sample data by converting the mixed carrier data to orthogonality; and
- a parallel-to-serial conversion unit for converting the sample carrier data into serial data, and outputting the serial sample carrier data.

12. The apparatus of claim 10, wherein said symbol accumulation unit comprises:
- an absolute value calculation unit for calculating the strength value of the carrier frequency offset of the carrier data received from said first mode switch;
- a first symbol delay unit for delaying the strength value calculated by said absolute value calculation unit for a duration of one symbol; and
- an adder for accumulating the strength value delayed by said first symbol delay unit and the strength value obtained by said absolute value calculation unit, and outputting the accumulated value.

13. The apparatus of claim 12, wherein said absolute value calculation unit obtains the strength value of the carrier frequency offset by squaring an absolute value of the carrier data.

14. The apparatus of claim 12, wherein said adder accumulates the strength value delayed by said first symbol delay unit and said strength value obtained by said absolute value calculation unit for at least two symbols.

15. The apparatus of claim 10, wherein said hold value detection unit comprises:
- an envelope detection unit for detecting an envelope value by comparing the accumulated strength value received from said adder with a predetermined threshold value; and
- a rise edge detection unit for controlling said voltage controlling oscillation unit through said second mode switch using the envelope value detected by said envelope detection unit.

16. The apparatus of claim 15, wherein the threshold value is obtained by averaging the strength value of the carrier frequency offset and is compared with the value accumulated during one symbol.

17. The apparatus of claim 15, wherein said rise edge detection unit counts until the envelope value detected by said envelope detection unit becomes larger than the threshold value, and then supplies the counted value to said voltage controlling oscillation unit.

18. The apparatus of claim 10, wherein said offset detection unit comprises:
- a continuous pilot extraction unit for extracting a continuous pilot signal from the serial carrier data which is obtained from said first mode switch;
- a second symbol delay unit for delaying the extracted continuous pilot signal for a duration of one symbol period, and outputting the delayed extracted continuous pilot signal; and
- a subtracter for obtaining a phase difference between the delayed continuous pilot signal the present continuous pilot signal, and supplying the phase difference to said loop filter unit.

19. The apparatus of claim 10, wherein said loop filter unit comprises a first-order active loop filter which uses a proportional gain when a present output of said offset detection unit is directly input to said voltage controlling oscillation unit, and an integer gain when an average of previous outputs of said offset detection unit are to be input to said voltage controlling oscillation unit.

20. The apparatus of claim 10, further comprising a controller for controlling said first and second switches according to the coarse mode and the fine mode.

21. The apparatus of claim 20, wherein said controller determines the fine mode based on the accumulated value of said symbol accumulation unit.

* * * * *